United States Patent
Kerschbaumer et al.

(10) Patent No.: US 8,898,780 B2
(45) Date of Patent: Nov. 25, 2014

(54) ENCODING LABELS IN VALUES TO CAPTURE INFORMATION FLOWS

(75) Inventors: Christoph Kerschbaumer, Santa Clara, CA (US); Mohammad H. Reshadi, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 341 days.

(21) Appl. No.: 13/399,136

(22) Filed: Feb. 17, 2012

(65) Prior Publication Data

US 2013/0117845 A1  May 9, 2013

Related U.S. Application Data

(60) Provisional application No. 61/556,658, filed on Nov. 7, 2011.

(51) Int. Cl.
 *G06F 15/16* (2006.01)
 *G06F 21/62* (2013.01)
 *G06F 21/53* (2013.01)

(52) U.S. Cl.
 CPC ............ *G06F 21/6227* (2013.01); *G06F 21/53* (2013.01); *G06F 2221/2113* (2013.01); *G06F 2221/2125* (2013.01)
 USPC ........ 726/22; 726/1; 726/2; 726/14; 713/153; 713/155; 713/188

(58) Field of Classification Search
 CPC .............................. G06F 21/6227; G06F 21/53
 USPC ............. 713/153, 175, 188; 726/2, 12, 14, 22
 See application file for complete search history.

(56) References Cited

U.S. PATENT DOCUMENTS

| | | | | |
|---|---|---|---|---|
| 7,320,129 | B2 * | 1/2008 | Talwar et al. | 718/1 |
| 7,627,766 | B2 * | 12/2009 | Chen et al. | 713/182 |
| 2006/0248599 | A1 * | 11/2006 | Sack et al. | 726/27 |
| 2007/0006294 | A1 * | 1/2007 | Hunter | 726/14 |
| 2007/0256117 | A1 * | 11/2007 | Shomo | 726/2 |
| 2008/0301766 | A1 * | 12/2008 | Makino et al. | 726/1 |
| 2010/0049974 | A1 * | 2/2010 | Winjum et al. | 713/166 |
| 2010/0180339 | A1 | 7/2010 | Finlayson et al. | |
| 2011/0185427 | A1 | 7/2011 | Aciicmez et al. | |

OTHER PUBLICATIONS

"Encoding Information Flow in AURA, Technical Appendix"—Jia et al, University of Pennslyvania, Jun. 2009 http://repository.upenn.edu/cgi/viewcontent.cgi?article=1952&context=cis_reports.*

(Continued)

*Primary Examiner* — Randy Scott

(57) ABSTRACT

Methods, servers, and systems for encoding security labels in a dynamic language value to allow cross script communications within client application while limiting the types of information that is allowed to be communicated back to a host server. Static analysis is performed during compilation, and the results are used to generate and insert additional code that updates, modifies and propagates labels (e.g., JavaScript labels) attached to values (e.g., JavaScript values) during execution of a program. To support popular language features that allow for strong integration with other web-based systems, malicious code is allowed to perform operations locally (e.g., on the client), and a detection and prevention mechanism identifies and stops malicious code from sending requests or gathered information over the network, naturalizing attacks and improving the security of applications that embed dynamic language code.

12 Claims, 10 Drawing Sheets

(56) References Cited

OTHER PUBLICATIONS

Dhawan M., et al., "Analyzing Information Flow in JavaScript-Based Browser Extensions", Computer Security Applications Conference, 2009. ACSAC '09. Annual, IEEE, Piscataway, NJ, USA, Dec. 7, 2009, pp. 382-391, XP031610287, ISBN: 978-0-7695-3919-5.

International Search Report and Written Opinion—PCT/US2012/057682—ISA/EPO—Mar. 6, 2013.

Limin Jia et al., "Encoding Information Flow in AURA, Technical Appendix," Tech. Rpt. No. MS-CIS-09-08, Univ. Pennsylvania, Jun. 2009.

\* cited by examiner

ENCODING LABELS IN VALUES TO CAPTURE INFORMATION FLOWS

RELATED APPLICATION

This application claims the benefit of priority to U.S. Provisional Patent Application No. 61/556,658 entitled "Encoding Labels in JavaScript Values to Capture Information Flows" filed Nov. 7, 2011, the entire contents of which are hereby incorporated by reference.

BACKGROUND

In recent years, dynamic scripting languages (e.g., JavaScript®, ActionScript®, DART®, PHP, Python®, Ruby, etc.) have become significantly more powerful, and as a result, are now more widely used to implement online and web-based software applications. Dynamic scripting languages now include a number of features typically associated with high-level software languages, a flexible typing system, an extensive set of libraries, and other features that strongly support integration with other web-based systems. For these and other reasons, dynamic scripting languages are now used by most Web 2.0 applications and are growing in popularity.

Another growing trend in online and web-based software development is the embedding of third party scripts into a client application (e.g., webpage, browser, etc.). Embedded scripts may be used to retrieve, and place content and executable code (e.g., advertising banners, stock tickers, etc.) on third party sites. Embedded scripts may also be used to implement mashups, which are web-pages or applications that combine data, code, features, services, and/or functions from two or more sources to create a new service or application. Many dynamic scripting languages include features that support these growing trends, and as a result, are being used more frequently to embed scripts in websites. These embedded third party scripts may include malicious code that allows an attacker to exploit language vulnerabilities to gather sensitive information and send it to an attacker-controlled server. Improving the security of scripting languages and applications that embed third-party scripting languages is becoming an ever more important design criterion.

SUMMARY

The various aspects include systems, methods, and devices configured to allow cross script communications within a software client while limiting the types of information that is allowed to be communicated back to a host server. In an aspect, a method of encoding security labels in a dynamic language value may include allocating a number of bits in the dynamic language value to store encoded labels, reserving one bit in the allocated bits to signify whether the security labels are encoded in a first mode or a second mode, and tagging the dynamic language value with security labels that identify an originating domain, the security labels being encoded in either the first mode or the second mode. In an aspect, the method may further include determining whether the reserved bit indicates that the first mode or the second mode is selected, identifying the security label as being encoded as one-hot-bit, and performing a bitwise OR operation if it is determined that the reserved bit indicates that the first mode is selected, and identifying the security label as being a reference into a label manager data-structure that stores actual label information and performing memory read operations if it is determined that the reserved bit indicates that the second mode is selected. In an aspect, tagging the dynamic language value with security labels that identify an originating domain may include encoding dynamic language labels in the first mode if the number of scripts accessing information from scripts originating from other domains is less than the number of allocated bits. In an aspect, allocating a number of bits in the dynamic language value to store encoded labels may include allocating a number of bits in a JavaScript value to store encoded labels. In an aspect, the method may be implemented using any dynamic or scripting languages including, for example, JavaScript®, ActionScript®, DART®, PHP, Python®, Ruby, PERL, Scala, Erlang, Candle, as well as Java®, and .NET languages.

Further aspects include a computing device that includes means for allocating a number of bits in a dynamic language value to store encoded labels, means for reserving one bit in the allocated bits to signify whether the security labels are encoded in a first mode or a second mode, and means for tagging the dynamic language value with security labels that identify an originating domain, the security labels being encoded in either the first mode or the second mode. In an aspect, the computing device includes means for determining whether the reserved bit indicates that the first mode or the second mode is selected, means for identifying the security label as being encoded as one-hot-bit, and performing a bitwise OR operation if it is determined that the reserved bit indicates that the first mode is selected, and means for identifying the security label as being a reference into a label manager data-structure that stores actual label information and performing memory read operations if it is determined that the reserved bit indicates that the second mode is selected. In a further aspect, means for tagging the dynamic language value with security labels that identify an originating domain may include means for encoding dynamic language labels in the first mode if the number of scripts accessing information from scripts originating from other domains is less than the number of allocated bits. In a further aspect, means for allocating a number of bits in a dynamic language value may include means for allocating a number of bits in a language selected from the group consisting of Java®, JavaScript®, ActionScript®, DART®, PHP, Python®, Ruby, PERL, Scala, Erlang, Candle, and .NET languages.

Further aspects include a computing device that includes a processor configured with processor-executable instructions to perform operations for encoding security labels in a dynamic language value that may include allocating a number of bits in the dynamic language value to store encoded labels, reserving one bit in the allocated bits to signify whether the security labels are encoded in a first mode or a second mode, and tagging the dynamic language value with security labels that identify an originating domain, the security labels being encoded in either the first mode or the second mode. In an aspect, the processor may be configured with processor-executable instructions to perform operations that may further include determining whether the reserved bit indicates that the first mode or the second mode is selected, identifying the security label as being encoded as one-hot-bit, and performing a bitwise OR operation if it is determined that the reserved bit indicates that the first mode is selected, and identifying the security label as being a reference into a label manager data-structure that stores actual label information and performing memory read operations if it is determined that the reserved bit indicates that the second mode is selected. In a further aspect, the processor may be configured with processor-executable instructions such that tagging the dynamic language value with security labels that identify an originating domain includes encoding dynamic language labels in the first mode if the number of scripts accessing information from scripts originating from other domains is less than the number of allocated bits. In a further aspect, the processor may be configured with processor-executable instructions such that allocating a number of bits in the dynamic language value includes allocating a number of bits in a language selected from the group consisting of Java®, JavaScript®, ActionScript®, DART®, PHP, Python®, Ruby, PERL, Scala, Erlang, Candle, and .NET languages.

Further aspects include a non-transitory computer readable storage medium having stored thereon processor-executable software instructions configured to cause a processor to perform operations for encoding security labels in a dynamic language value, the operations including allocating a number of bits in the dynamic language value to store encoded labels, reserving one bit in the allocated bits to signify whether the security labels are encoded in a first mode or a second mode, and tagging the dynamic language value with security labels that identify an originating domain, the security labels being encoded in either the first mode or the second mode. In an aspect, the store processor-executable software instructions may be further configured to cause a processor to perform operations including determining whether the reserved bit indicates that the first mode or the second mode is selected, identifying the security label as being encoded as one-hot-bit, and performing a bitwise OR operation if it is determined that the reserved bit indicates that the first mode is selected, and identifying the security label as being a reference into a label manager data-structure that stores actual label information and performing memory read operations if it is determined that the reserved bit indicates that the second mode is selected. In a further aspect, the store processor-executable software instructions may be further configured to cause a processor to perform operations such that tagging the dynamic language value with security labels that identify an originating domain includes encoding dynamic language labels in the first mode if the number of scripts accessing information from scripts originating from other domains is less than the number of allocated bits. In a further aspect, allocating a number of bits in the dynamic language value may include allocating a number of bits in a language selected from the group consisting of Java®, JavaScript®, ActionScript®, DART®, PHP, Python®, Ruby, PERL, Scala, Erlang, Candle, and .NET languages.

BRIEF DESCRIPTION OF THE DRAWINGS

The accompanying drawings, which are incorporated herein and constitute part of this specification, illustrate exemplary aspects of the invention, and together with the general description given above and the detailed description given below, serve to explain the features of the invention.

DETAILED DESCRIPTION

Figure 1:
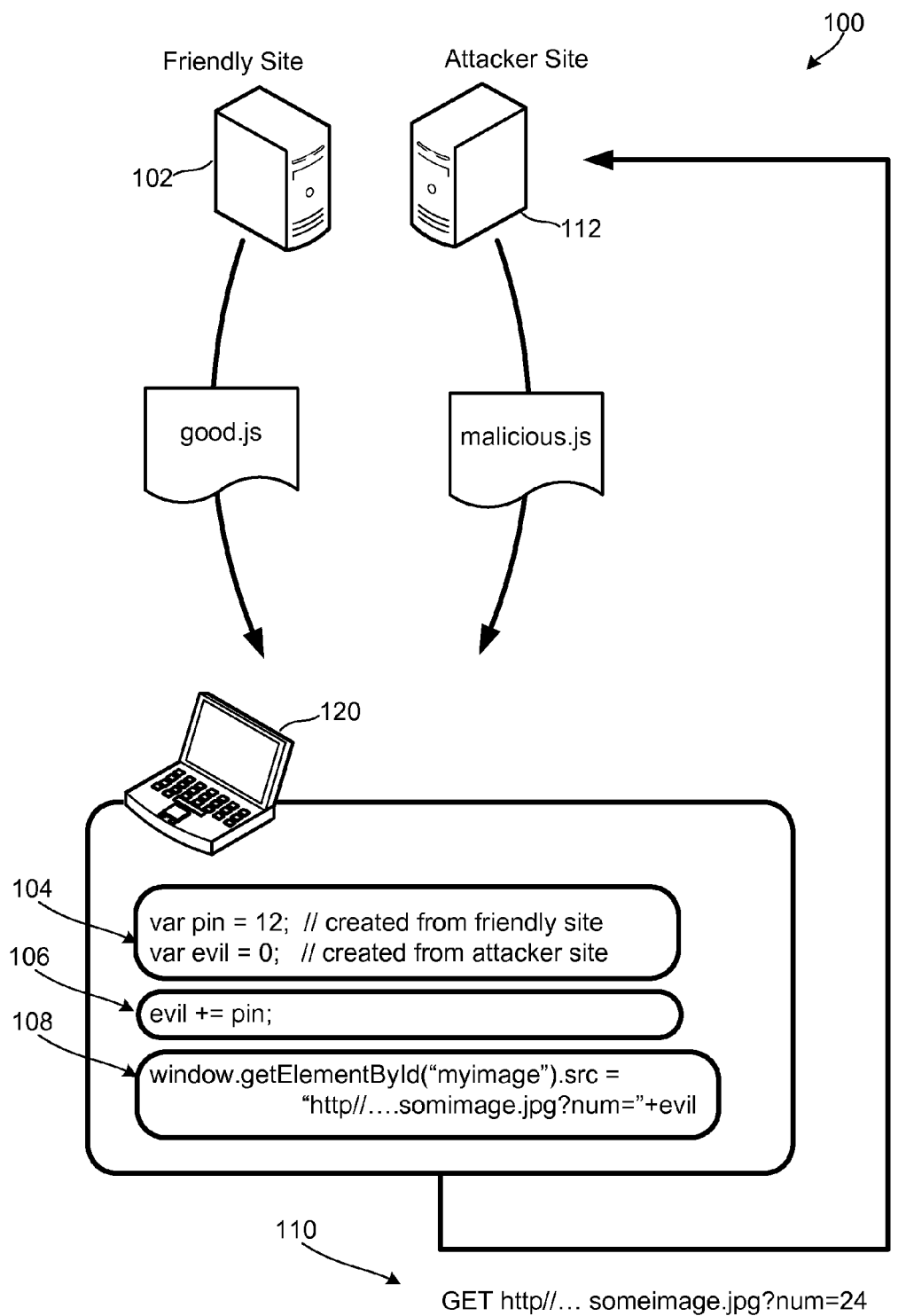
FIG. 1 is a component block diagram illustrating logical flows in an example computing network having a client application that embeds scripts from multiple domains.

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The term "computing device" is used generically herein to refer to any one or all of servers, personal computers, mobile devices, cellular telephones, tablet computers, laptop computers, netbooks, palm-top computers, personal data assistants (PDA's), wireless electronic mail receivers (e.g., the Blackberry® and Treo® devices), multimedia Internet enabled cellular telephones (e.g., the Blackberry Storm®), Global Positioning System (GPS) receivers, wireless gaming controllers, personal computers, and similar personal electronic devices which include a programmable processor. While the various aspects are particularly useful in mobile devices, such as cellular telephones, which have limited processing power, the aspects are generally useful in any computing device that executes scripts and applications written in dynamic and/or scripting languages.

The term "mashup" is used herein to refer to a client application or webpage that combines data, content, code, features, services, and/or functions (collectively "content") from two or more sources to create a new service/application. The content may be combined in an integrated and coherent manner, or may be dispersed and disjointed. Mashups may be server-based or client-based. Server-side mashups generally integrate the content on a server that acts as a proxy between a client application (e.g., a browser) and one or more host web sites. Client-side mashups integrate content directly on the client application. Mashups may also be used with software provided as a service (SaaS) or with service oriented architectures (SOAs).

The terms "dynamic language" and "scripting language" are used generically and interchangeably in this application and may refer to any dynamic or scripting language used to write programs (herein as "scripts") that are interpreted, compiled, or dynamically translated at runtime, or any language that supports just-in-time (JIT) compilation. These terms may also refer to any language that includes a runtime, virtual machine, and/or is dynamically compiled. Examples of dynamic and scripting languages within the scope of this application include, for example, JavaScript®, ActionScript®, DART®, PHP, Python®, Ruby, PERL, Scala, Erlang, Candle, as well as Java®, .NET languages, and other languages that may be developed in the future.

Various aspects are described herein using JavaScript® and JavaScript-related terminology as a convenient example of a dynamic language that may be used or addressed by the various aspects. However, it should be understood that the examples referring to JavaScript®, and other references to the JavaScript® language herein, are for illustration purposes only, and are not intended to limit the descriptions or the claims to that particular type of dynamic language. Therefore the scope of the claims should not be construed as reciting or requiring JavaScript® unless specifically recited in the claims.

Many dynamic languages enable client applications to be formed from content and code (libraries, advertisements, etc.) originating from many different websites, and a growing trend in software development is to embed many different third party scripts on a single website. These dynamic languages allow the embedded third party code to be downloaded from multiple sources at run time. The embedded scripts may have access to sensitive information on the hosting web page (e.g., cookies, location bar, corporate customer accounts, etc.), and most browsers allow these scripts to dynamically access and modify variables and information from the embedding page. Malicious code may exploit these and other vulnerabilities to gather sensitive information from the user, and attempt to send such information to an attacker-controlled server, which could use the information to perpetuate a fraud on the user. Malicious code may also access/modify values stored in universal resource locator (URL) string variables to redirect the page to a malicious site without the user's consent or knowledge. Existing methods of providing web-based security are ill-equipped to handle these types of attacks and/or are too cumbersome to implement in a constrained computing environment, such as in mobile computing devices.

In addition to the above-mentioned vulnerabilities, many dynamic languages allow an attacker to add and/or modify document object model (DOM) objects to send various kinds of network requests (e.g., AJAX requests and/or a GET request for images) which may be used in combination with other language features (e.g., mouse over effects) to initiate an injection attack. Injection attacks allow attackers to insert code that performs malicious actions without noticeably affecting the user experience, and without any observable differences in runtime behavior, users generally do not notice that their data has been exfiltrated. Moreover, many dynamic languages support a flexible typing system that makes them resistant to traditional static analysis techniques. Also, client applications (e.g., web browsers) commonly allow scripts and libraries to be dynamically loaded and executed within a shared context and memory space. These features allow authors, both malicious and benign, to deliver scripts for execution on the client computing device that may be used to initiate attacks. Existing methods for identifying malicious code and preventing such attacks generally require a full verification of information security and/or complex labeling schemes, and are too inefficient, complex, and expensive to implement in constrained computing environments (e.g., mobile computing devices, etc.).

Existing solutions for preventing security violations for the above-mentioned scenarios generally include implementing at one of two popular security models: a sandbox model; and a same origin policy (SOP) model. The sandbox model allows client applications to limit the amount of damage that malicious code can cause by preventing multiple content sources from interacting with one another. Systems implementing a sandbox model may limit the interactions such that data inside a particular client (e.g., a browser tab, browser, etc.) is prevented from being communicated to other clients or the local system. For example, when visiting a webpage, clients implementing the sandbox model may prevent the access of unauthorized sockets and/or files on the host computing device and/or communications with unauthorized websites. As another example, clients implementing the sandbox model may require that embedded scripts only perform web-related actions, and not general-purpose programming tasks (e.g., creating and reading files, etc.).

Clients implementing a same origin policy (SOP) model generally constrain an embedded script's access to information that does not originate from the same source. For example, a same origin policy may permit scripts having the same origin to access each other's methods and objects, but prevents scripts having different origins from accessing each other's methods and objects. In this manner, clients implementing a same origin policy (SOP) may prevent malicious scripts from breaching the confidentiality and integrity of information pertaining to a different domain.

While these models provide some improvements in security, current implementations are generally too restrictive, too ineffective, too inefficient and/or expensive to implement in a constrained computing environment. Moreover, since existing security models (e.g., sandbox, SOP, etc.) generally limit inter- and cross-script communications, they are ill-equipped to balance the levels of security and functionality required by users for the new and emerging technologies and programming techniques (e.g., mashups, remote API, etc.) discussed above. Mashups, for example, complicate the implementation of existing security solutions because they often contain cooperating scripts from different domains that generate shared objects. To support the generation of these shared objects, a webpage cannot isolate code/scripts from different domains using the same origin policy (SOP). If an attacker manages to inject code into such a webpage, the entire page may be compromised.

The various aspects overcome these and other limitations of current security methods by allowing cross script communications within the client while limiting the types of information that are allowed to be communicated back to a host server. To support the popular language features that allow for strong integration with other web-based systems discussed above, malicious code may be allowed to perform operations locally (e.g., on the client). A detection and prevention mechanism may identify and stop malicious code from sending requests or any gathered information over the network, thereby naturalizing attacks and improving the security of applications that embed dynamic language code.

The various aspects perform static analyses during compilation, the results of which may be used to generate and insert additional code that updates, modifies, and propagates labels (e.g., JavaScript labels) attached to values (e.g., JavaScript values) during execution of a program.

The various aspects provide a tracking system that tracks information flows from within a software virtual machine Language values (e.g., JavaScript values) may be initially tagged with security labels that identify an originating domain. A language value may be any value that a particular portion of code (e.g., JavaScript code) can generate and/or read. A language label (e.g. JavaScript label) may associate the language values (e.g., JavaScript values) with a domain value (e.g., www.google.com) that identifies the origin of a particular piece of code.

In an aspect, the language labels and language values may be encoded in multiple levels. The use of multiple levels allows for the encoding of the labels in language values for information flow tracking by breaking the labels into two or more modes (e.g., a fast mode, slow mode, etc.), greatly simplifying the identification of language values that include information gained from other scripts. The language labels may then be used to prevent transmission of any information to sites inconsistent with the language labels, thereby preventing unauthorized exfiltration of information using a simple to implement mechanism.

FIG. 1 illustrates components and information flows 100 in example system on which confidential information is maliciously collected from a user and sent to an external server without the user's knowledge or consent. As mentioned above, client applications (e.g., web browsers) may pull and combine code (e.g., JavaScript scripts) from multiple sites/servers. In the illustrated example of FIG. 1, a client 120 receives code from both a first server/site (e.g., www.good.com) 102 and a second server/site (e.g., www.attacker.com) 112. In block 104, the code originating from the first server (e.g., www.good.com) may create a variable (e.g., pin) that includes confidential information (e.g., passwords, email-addresses, etc.). As mentioned above, dynamic languages (e.g., JavaScript®) allow multiple scripts to execute in the same execution context, and each code unit may modify the other's variables and functions. Thus, in block 106, the code from the second server (e.g., www.attcker.com) may read the variable (e.g., pin) created by the first server. In block 108, the code from the second server (e.g., www.attcker.com) may add a node to the DOM tree, request an image (e.g., someimage.jpg), and in block 110, cause the client 120 to send to the second server exfiltrated information (e.g., the value of pin) as a payload.

This unauthorized gathering of information may occur explicitly or implicitly. Explicit information flow gathering occurs when the value of one variable is explicitly dependent on the value of another variable, such as in an assignment statement. Implicit information flow gathering occurs when an attacker arranges a program to embezzle the data using knowledge of control paths not taken.

Figure 2:
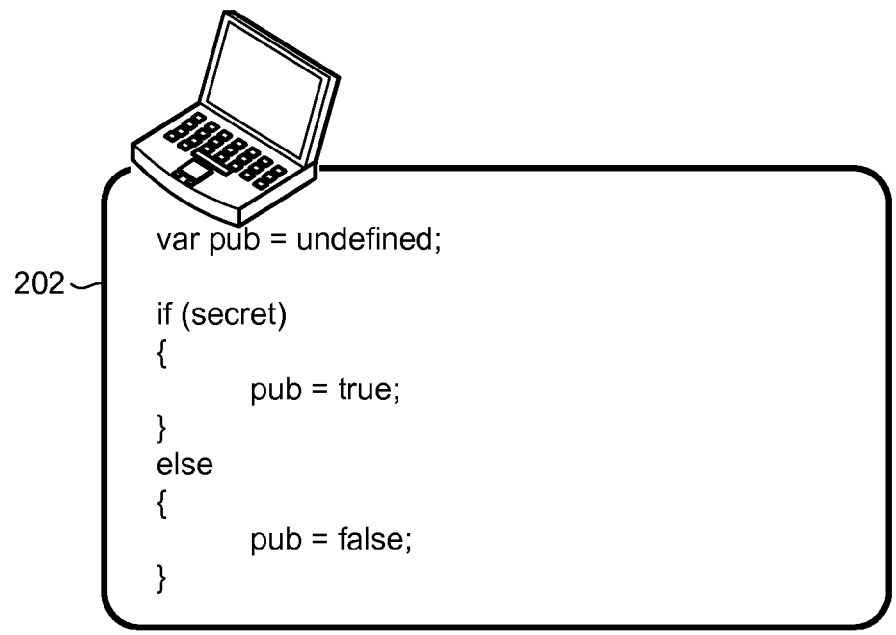
FIG. 2 is an illustration of example scripts that may be used to exfiltrate a secure variable using an implicit information flow.
Figure 2:
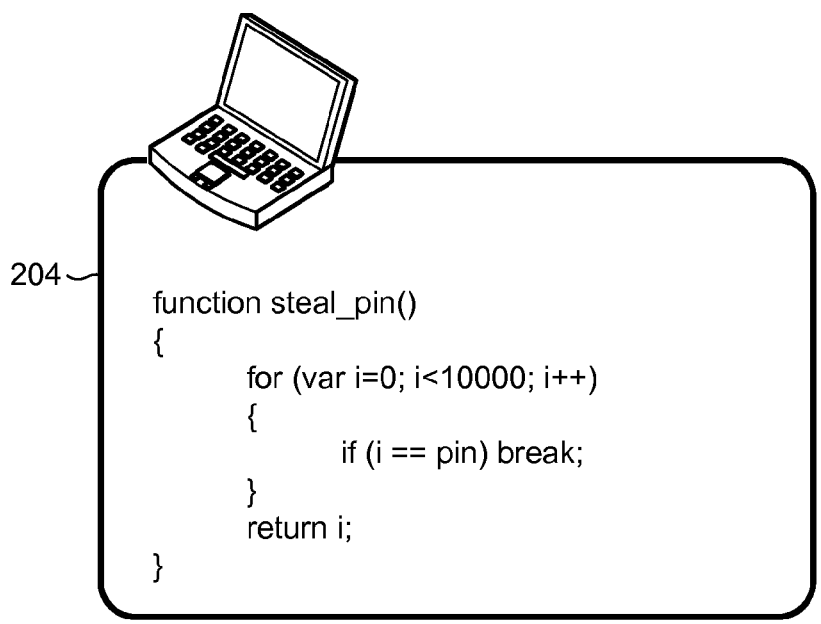

FIG. 2 illustrates example JavaScript scripts 202, 204 that may be used to exfiltrate a secure variable using an implicit information flow attack. In an implicit information flow attack, an attacker may logically infer the values of secret variables within a system by injecting code 202, 204 that contains control flow branches on secret values and observing the side-effects (or lack thereof) executed as a result. For this approach to work, the attacker must have some detailed knowledge of the system into which code will be injected, which is easily met on most web-based systems because source code is commonly shipped directly to the user. Common security designs attempt to prevent such attacks by securing the communication between different scripts being executed, and therefore try to stop cross site scripting before it occurs.

The various aspects depart from the common security designs, by executing malicious JavaScript and allowing cross site scripting, but preventing the gathered information from being communicated. Specifically, the detection and prevention of the attack may be deferred to when the malicious code actually attempts to send gathered information over the network, at which time the detection and prevention mechanism prevents the request from being communicated (exfiltrated) by the malicious code.

Figure 3:
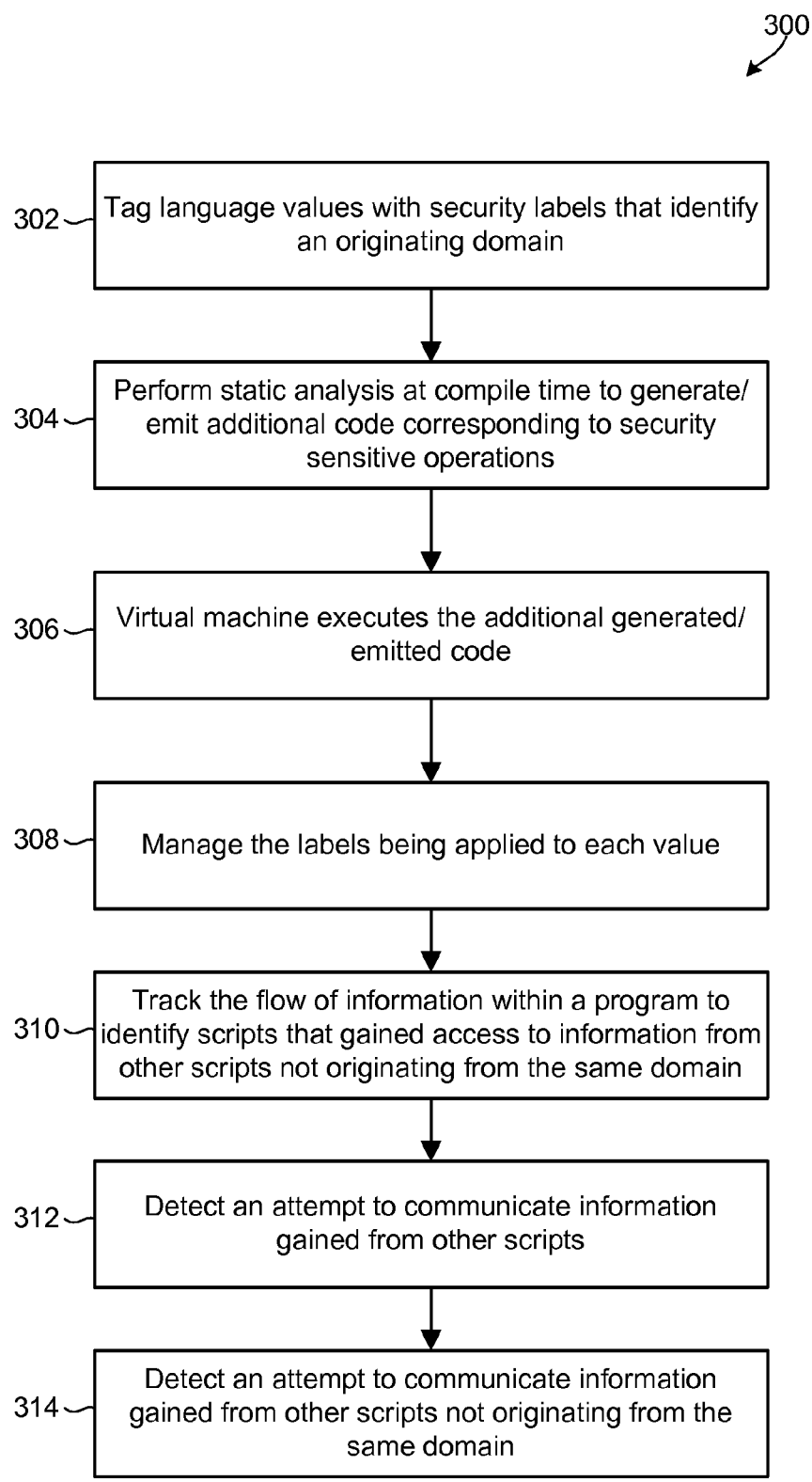
FIG. 3 is a process flow diagram of an aspect method for tracking information flows and preventing malicious scripts from communicating with a remote server.

FIG. 3 illustrates an aspect method 300 for tracking information flows and preventing malicious code from communicating with a remote server. In block 302, before execution, language values (e.g., JavaScript values) may be initially tagged with security labels that identify an originating domain. As discussed above, a language value may be any value that a particular portion of the dynamic language code can generate and/or read, and a language label (e.g., JavaScript label) associates the language values (e.g., JavaScript values) with a domain value (e.g., www.google.com) that identifies the origin of a particular piece of code.

In an aspect, the language labels and values may be encoded in multiple levels. The use of multiple levels allows for the encoding of the labels in values for information flow tracking by, for example, breaking the labels into two or more modes (e.g., a fast mode and a slow mode) and greatly simplifying the identification of language values, which may include information gained from other scripts.

Returning to FIG. 3, in block 304, static analysis may be performed at compile time, which may generate/emit additional code corresponding to security sensitive operations (e.g. assignments). In an aspect, the generated/emitted code may control flow branches and joins, and propagate the security tags for every language value (e.g., JavaScript value). In blocks 306-310, at runtime, a virtual machine (e.g., JavaScript virtual machine) may execute the additional generated/emitted code, manage the labels being applied to each value, and track the flow of information within a program. In block 312, a detection and prevention mechanism/process may perform operations to detect attempts to communicate information gained from other scripts that do originate from the same domain as the communicating script. In block 314, the detection and prevention mechanism/process may prevent the request from being sent over the network. In an aspect, the detection and prevention of attacks may be deferred until the malicious script attempts to send the gathered information over the network.

Figure 4A:
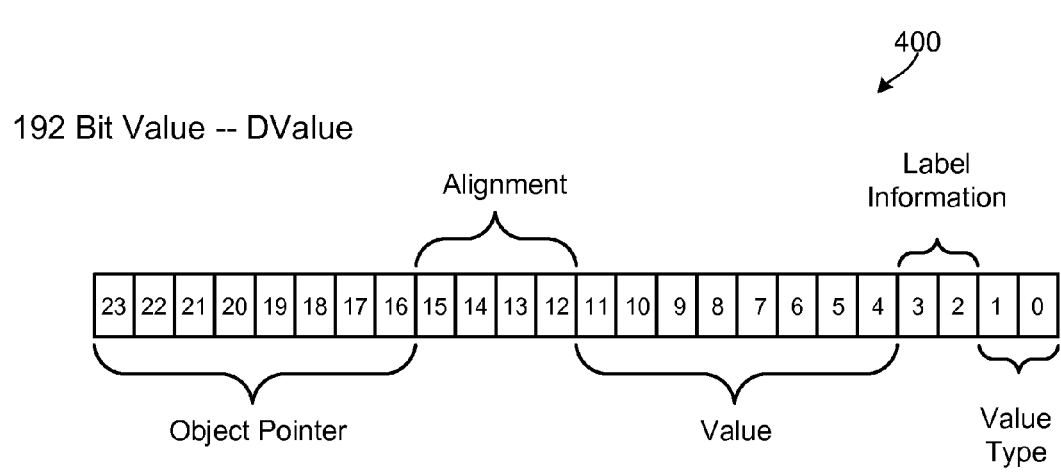
FIGS. 4A-B are message structure diagrams illustrating tags for storing dynamic values such that scripts attempting to communicate information gained from cross-scripting operations may be identified.
Figure 4B:
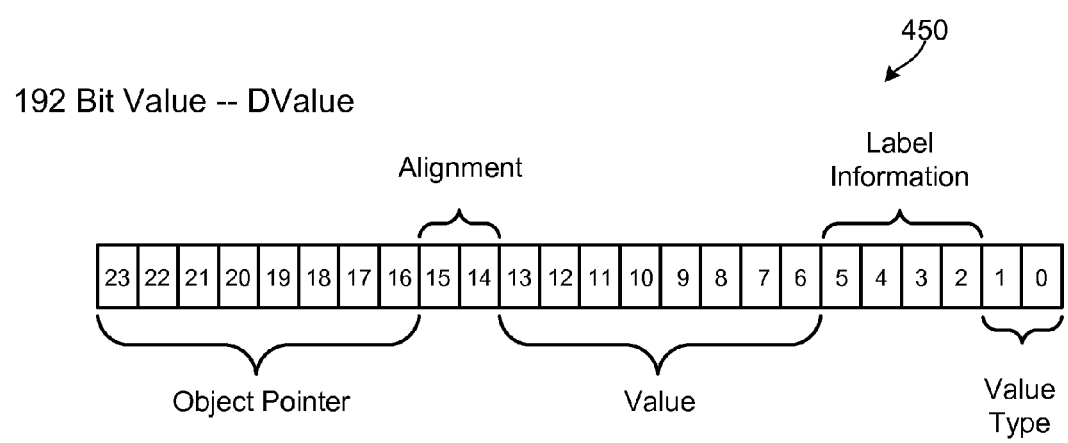

FIGS. 4A-B illustrate aspect labeling mechanisms/process 400, 450 for storing the language values such that scripts attempting to communicate information gained from cross-scripting operations are readily identified. For the sake of clarity, the following descriptions use JavaScript® as an exemplary dynamic language. However, it should be understood that a wide variety of dynamic languages fall within the scope of this application and that the scope of the claims should not be limited to JavaScript® unless expressly recited as such in the claims.

Generally, every language value may be stored as an m-bit value (e.g., 192-bit value), which in the JavaScript engine we call it Dynamic Value or DValue for short. In the illustrated examples of FIGS. 4A-B, the 192-bit DValues are represented as 24 bytes. JavaScript values may be stored such that lowest n-bits (e.g., bytes 0-1) store a type value (string, double, etc.), and the next x-bits (e.g., bytes 2-3, bytes 2-5) store label information that efficiently encodes the originating domain label information for the JavaScript value. In this manner, an x (e.g., 32, 64) number of different domains may be encoded in every JavaScript value, allowing for the use of a logical 'OR' operation for label joins, which only requires minimal runtime overhead.

As mentioned above, in an aspect, the labels and values may be encoded in multiple levels such that some of the x-bits encode originating domain label information, and such that some of the x-bits store a pointer to a location that contains label information. In an aspect, the number of x-bits used to encode the originating domain label information may be adjusted based on the number of scripts. In an aspect, the number of x-bits used to encode the originating domain label information may be adjusted based on information gained from prior executions, a user's browsing history, or based on metrics collected at runtime.

Returning to FIGS. 4A-B, in methods 400 and 450, JavaScript values may be stored such that y-bits (e.g., bytes 4-11, bytes 6-13) of the DValue structure store the actual value, z-bits (e.g., bytes 12-15, bytes 14-15) store alignment information, and the high bits (e.g., bytes 16-23) store an object pointer.

Figure 5:
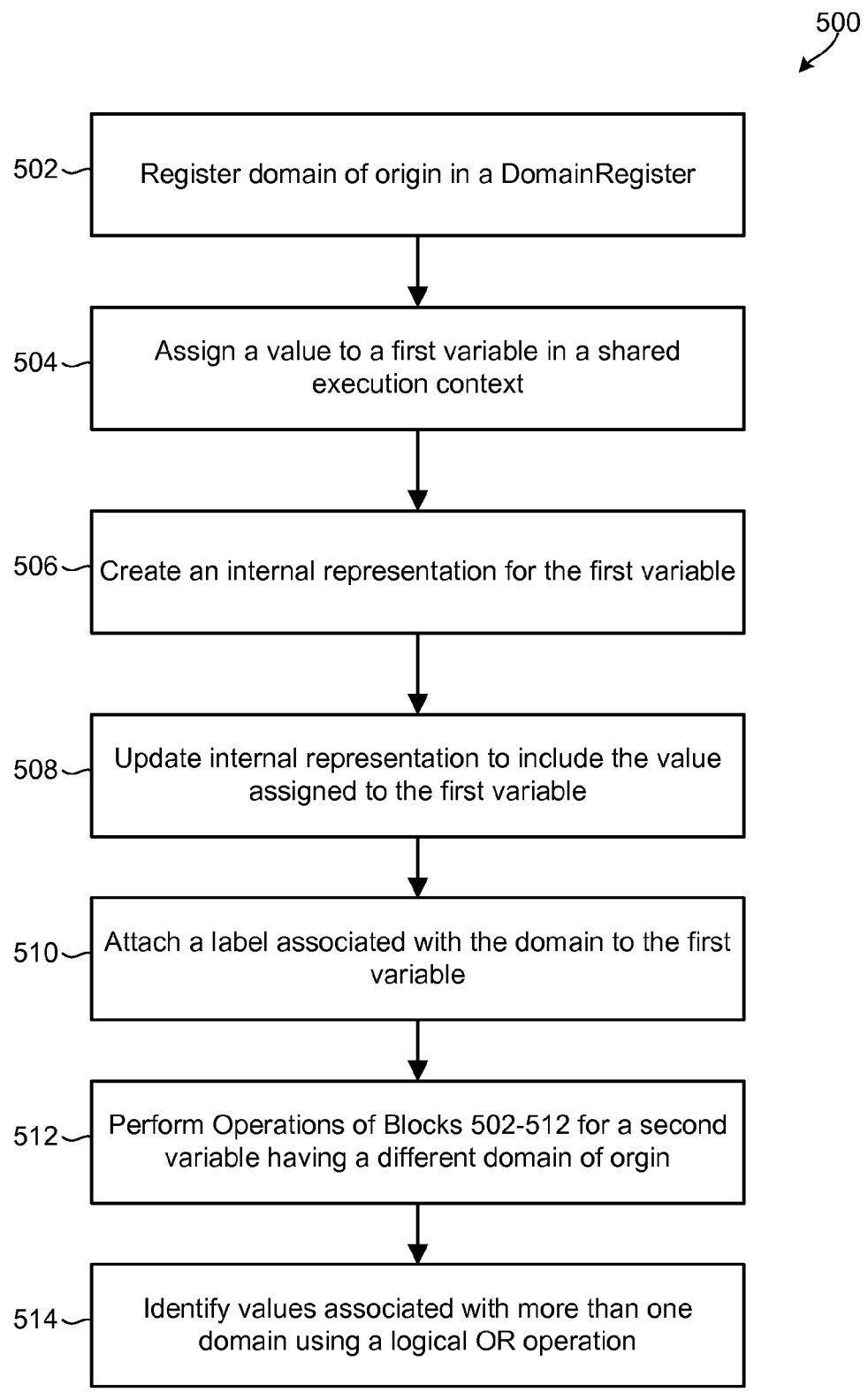
FIG. 5 is a process flow diagram of an aspect method for propagating labels in a runtime engine.

FIG. 5 illustrates an example method 500 for propagating labels in an interpreter (e.g., JavaScript engine) in accordance with an aspect. In block 502, before execution, an embedded unit of code (e.g., JavaScript script) may register its domain of origin (e.g., www.good.com,) in a domain register. In block 504, a value (e.g., 12) may be assigned to a first variable in an execution context that is shared across all of the executed programs. In block 506, an internal representation may be created for the first variable. In block 508, the internal representation may be updated to include the value (e.g., 12) assigned to the first variable by, for example, storing a binary representation (1100) of the value (e.g., 12) in the higher four bits. In block 510, a label (0000-0001) associated with the domain (e.g., www.good.com) may also be attached to the first variable. In block 512, the operations of blocks 502-510 may be performed for a second variable having a different domain of origin (e.g., www.attacker.com). In block 514, a label tag value identifying the values as being associated with more than one domain may be computed using a logical 'OR' operation.

Figure 6:
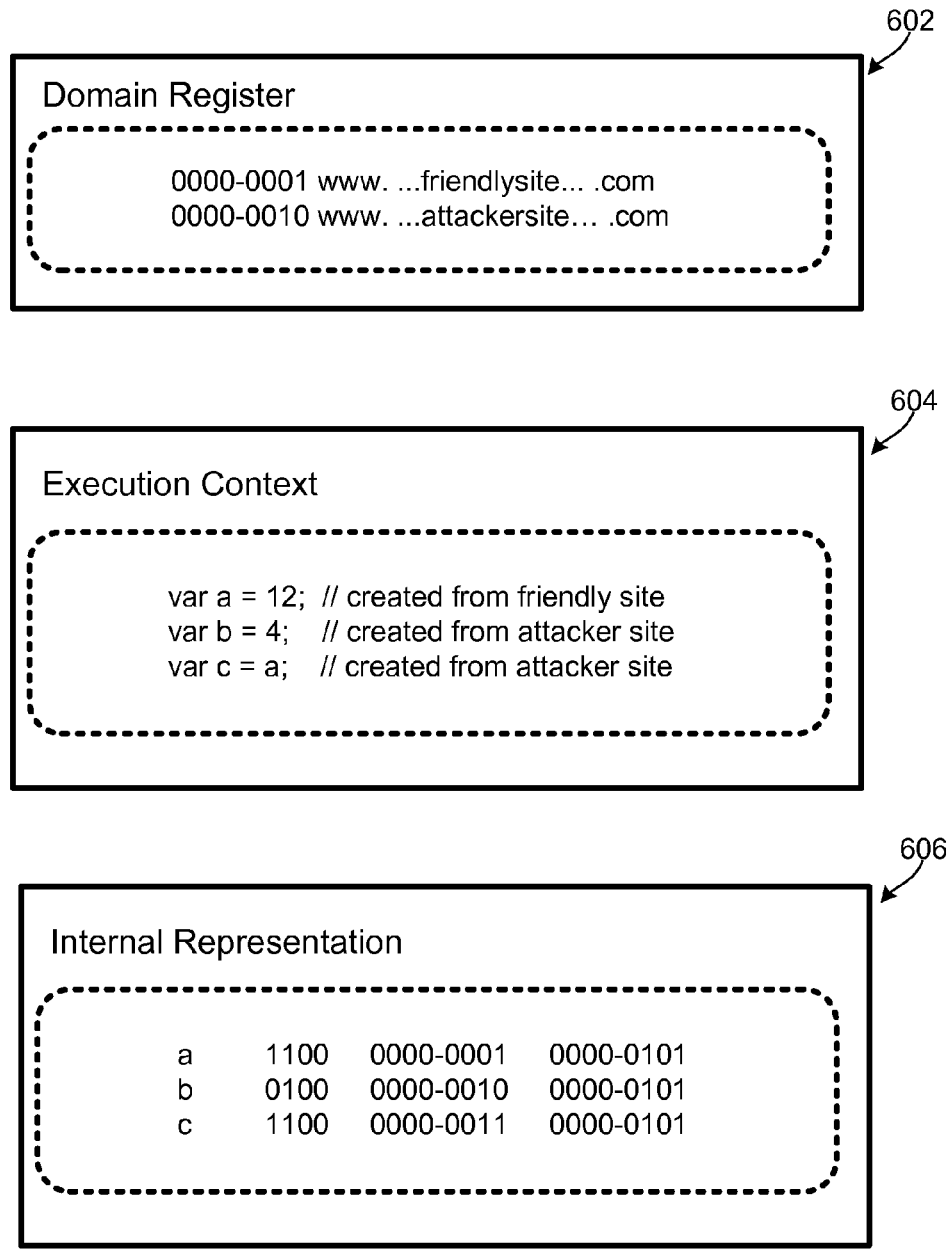
FIG. 6 is a data structure diagram illustrating values stored by logical components while propagating labels in accordance with an aspect.

FIG. 6 is a diagram illustrating the values of a domain register, execution context and internal representations of language values while propagating labels in an interpreter (e.g., JavaScript engine) in accordance with aspect method 500. Before execution, every unit of code (e.g., JavaScript scripts) may register its domain of origin (e.g., www.good.com, www.attacker.com) in a domain register 602 and an internal representation 604 may be created for example variables a, b, and c. A value (e.g., 12) may be assigned to variable "a" in the shared execution context 604, which may be shared across all the executed programs. The internal representation may then be updated to include the value (e.g., 12) assigned to variable "a," by storing a binary representation (1100) of the value (e.g., 12) in the higher four bits. A label (0000-0001) associated with the domain (e.g., www.good.com) may also be attached to variable "a." The lower 8 bits (0000-0101) may define the assigned value type (e.g., integer, double, etc.)

In the illustrated example of FIG. 6, the internal representation for the variable "b" follows the same schemata as variable "a." However, variable "c" includes a label tag value (0000-0011) that identifies the value as being associated with the labels of domain www.good.com and www.attacker.com. In an aspect, this information may be used to decide whether to allow a network request to send information.

In an aspect, the label tag value identifying the values as being associated with more than one domain may be computed using a logical OR operation. Before any request is sent over the network, various aspects may check whether the information is allowed to be sent to that domain or if a security violation occurred. Labels of that value may be compared, and the results of that comparison may be used to decide whether the send request is to be allowed.

The various aspects prevent client applications from leaking information. The propagation labels may lead to label creep (label explosion) wherein every value is labeled with all possible labels. In an aspect, JavaScript® executed such that label creep does not occur and/or does not impact performance. In an aspect, information leaks that are based on timing channels may be ignored.

Figure 7:
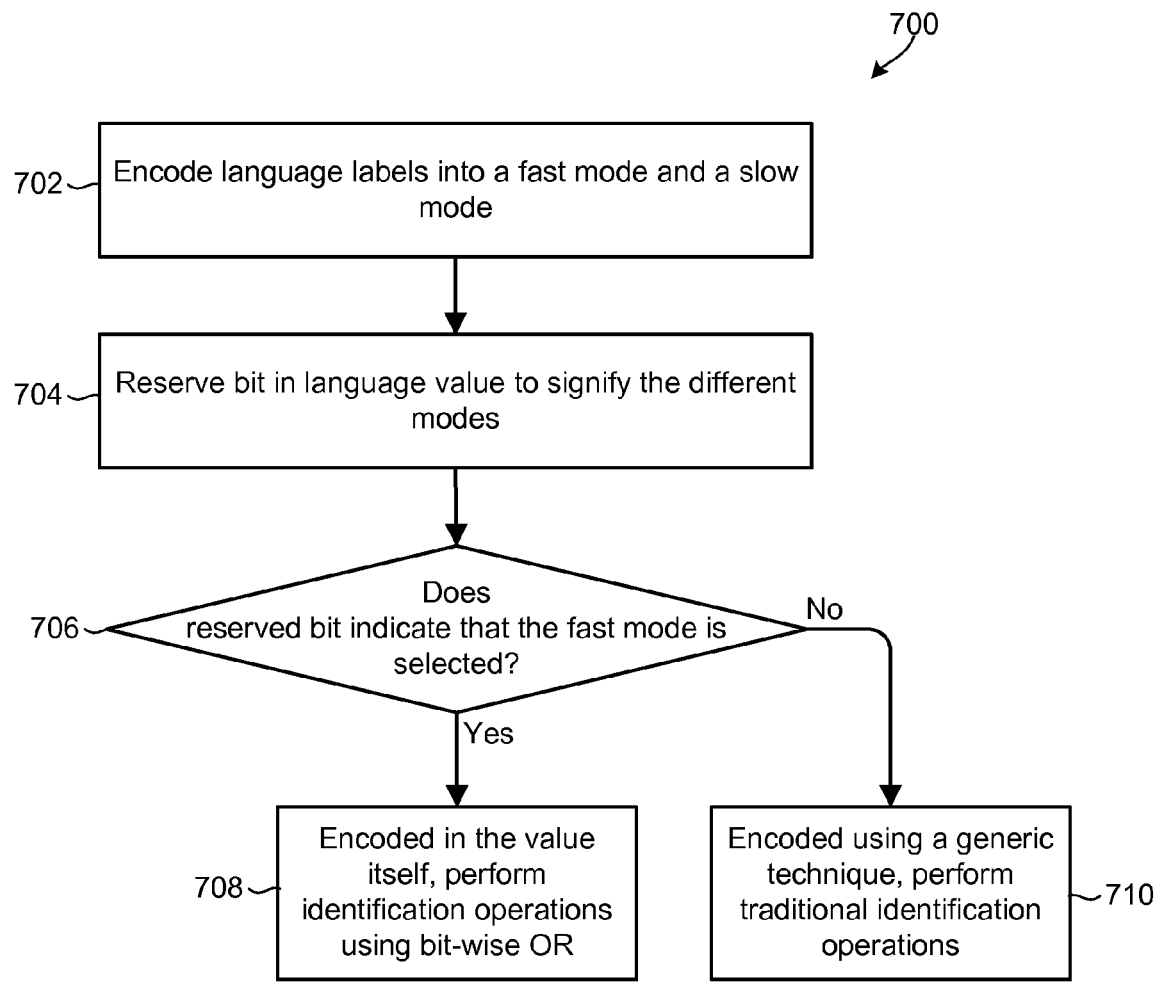
FIG. 7 is a process flow diagram of an aspect method for using efficiently labeled multi-level values to block the leakage of tainted data to a server or third party.

FIG. 7 illustrates an aspect method 700 for using efficiently labeled multi-level values to block the leakage of tainted data to a server or third party. As discussed above with reference to FIGS. 4A-B, the x-bits (e.g., bytes 2-3, bytes 2-5) may store label information that efficiently encodes the originating domain label information for the language value. As also discussed above, in various aspects, labels and values may be encoded in multiple levels. The use of multiple levels allows for the encoding of the labels in JavaScript values for information flow tracking by breaking the labels into two or more modes (e.g., a fast mode, slow mode, etc.), greatly simplifying the identification of language values that include information gained from other scripts.

Referring to FIG. 7, in block 702, language labels may be encoded in the language values in two modes: a fast mode that encode all the labels as one-hot-bit in the value itself; and a slow mode that encodes the labels as a reference to a value stored on another memory location. In block 704, one bit may be reserved to signify whether the first mode (e.g., "fast mode") or the second mode (e.g., "slow mode") is to be used. For example, in a configuration in which 16 bits (e.g., bytes 2-3) are reserved for storing label information (e.g., FIG. 4A), the $16^{th}$ bit may be reserved to signify whether the first mode (e.g., "fast mode") or the second mode (e.g., "slow mode") is to be used. In determination block 706, it is determined whether the reserved bit indicates that the fast mode is selected. If it is determined that the fast mode is selected (i.e., determination block 706="Yes"), in block 708, the rest of the bits are identified as being encoded in the value itself and the identification operations may be performed using a simple bitwise OR operation. If it is determined that the slow mode is selected (i.e., determination block 706="No"), in block 710, the rest of the bits may be identified as being encoded using a generic technique for managing the labels. For example, in a configuration in which 16 bits (e.g., bytes 2-3) are reserved for storing label information (e.g., FIG. 4A), when a $16^{th}$ script accesses a value from another script, there is no longer any space to store the label values (i.e., the DValue runs out of bits reserved for label information) and the label values must be encoded in the slow mode to store indexes that may be used as keys into a label manager data-structure that stores the actual label information.

In an aspect, the label manager may be configured such that the label is an index into an array, which may be as big as necessary to store more label information. In this manner, a large number of scripts may be supported, while at the same time, speed is greatly improved for each JavaScript value that does not contain a large enough number of cross-communicating scripts (e.g., 15 scripts or less in the above example) for the values to be stored in a slow mode, allowing the identification operations to be performed using a simple bitwise OR operation.

The various aspects depart from conventional security solutions, which generally focus on securing communications between the different scripts being executed to stop cross-site scripting. The various aspects allow malicious JavaScript® to be executed locally, but prevent the malicious code from sending information to a host site. The various aspects also depart from existing information flow tracking methodologies by encoding JavaScript labels and values in multiple levels, allowing for the encoding of JavaScript labels as one-hot-bit in a JavaScript value itself. This greatly reduces complexity, improves efficiency, and allows the various aspects to be implemented in constrained computing environments, all without affecting the user experience. The various aspects balance operation complexity, storage capacity, and overhead associated access times to greatly improve the overall performance.

The aspects may be implemented on any of a variety of computing devices, such as mobile computing devices, such as multifunction cellular telephones, and personal computers. The aspects may be particularly helpful in computing devices with relatively limited processing capabilities and/or resources which may benefit from the performance savings.

Figure 8:
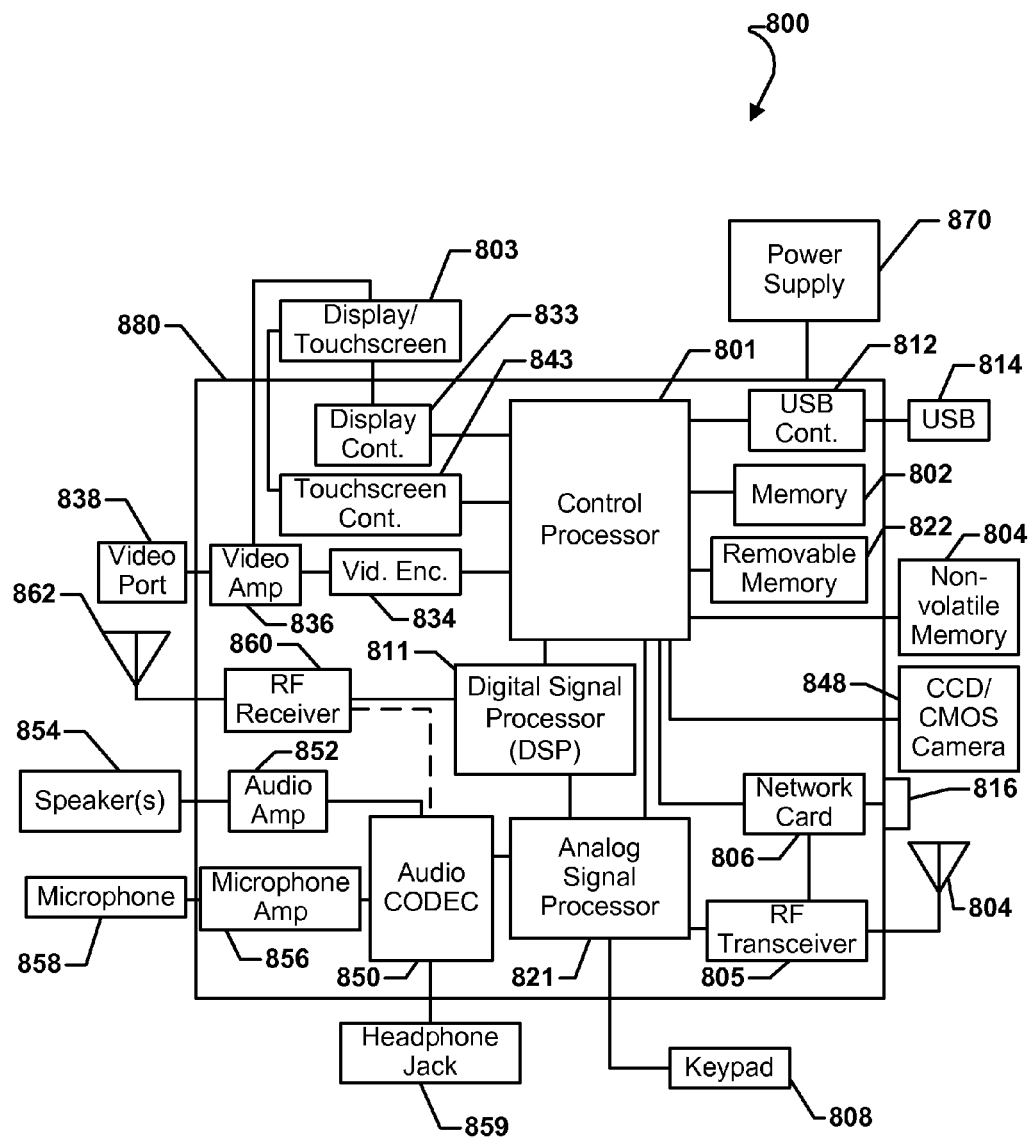
FIG. 8 is a component block diagram of a computing device suitable for use with the various aspects.

Example components and modules of an exemplary, non-limiting aspect of such a computing device 800 are illustrated in FIG. 8. A computing device 800 may include circuit board 880 of electronic components, some or all of which may be integrated into an on-chip system, that includes a control processor 801 coupled to memory 802. The control processor 801 may further be coupled to a digital signal processor 811 and/or an analog signal processor 821, which also may be coupled together. In some aspects, the control processor 801 and a digital signal processor 811 may be the same component or may be integrated into the same processor chip. A display controller 833 and a touchscreen controller 843 may be coupled to the control processor 801 and to a display or a touchscreen display 803 within or connected to the computing device 800.

The control processor 801 may also be coupled to removable memory 822 (e.g., an SD memory or SIM card in the case of mobile computing devices) and/or to external memory 804, such as one or more of a disk drive, CD drive, and a DVD drive. The control processor 801 may also be coupled to a universal serial bus (USB) controller 812 which couples to a USB port 814. Also, a power supply 870 may be coupled to the circuit board 880 through the USB controller 812 or through different electrical connections to provide power (e.g., DC power) to the various electronic components.

The control processor 801 may also be coupled to a video encoder 834, e.g., a phase alternating line (PAL) encoder, a sequential color with memory (SECAM) encoder, or a national television system(s) committee (NTSC) encoder. Further, the video encoder 834 may be coupled to a video amplifier 836 which may be coupled to the video encoder 834 and the display or touchscreen display 803. Also, a video port 838 may be coupled to the video amplifier 836 to enable connecting the computing device 800 to an external monitor, television or other display (not shown).

In some aspects, particularly mobile computing devices, the control processor 801 may be coupled to a radio frequency (RF) transceiver 805, such as via an analog signal processor 821. The RF transceiver 805 may be coupled to an RF antenna 804 for transmitting and receiving RF signals. The RF transceiver 805 may be configured to transmit and receive communication signals of one or more different wireless communication protocols including, for example, cellular telephone (e.g., G-3, UMTS, CDMA, etc.), WiFi, WiMax, and Blue-Tooth.

The control processor 801 may further be coupled to a network card 806 which may be coupled to a network connector 816 and/or the RF transceiver 805 and configured to enable communications via an external network (e.g., local area networks, the Internet, an intranet, WiFi networks, Blue-Tooth networks, personal area network (PAN) etc.) The network card 806 may be in the form of a separate chip or card, or may be implemented as part of the control processor 801 or the RF transceiver 805 (or both) as a full solution communication chip.

A number of analog devices may be coupled to the control processor 801 via the analog signal processor 821, such as a keypad 808 as shown in FIG. 8. In other implementations, a keypad or keyboard may include its own processor so that the interface with the control processor 801 may be via direct connection (not shown), via a network connection (e.g., via the network card), or via the USB port 814.

In some implementations, a digital camera 848 may be coupled to the control processor 801. In an exemplary aspect, the digital camera 848 may be a charge-coupled device (CCD) camera or a complementary metal-oxide semiconductor (CMOS) camera. The digital camera 848 may be built into the computing device 800 or coupled to the device by an external cable.

In some implementations, an audio CODEC 850 (e.g., a stereo CODEC) may be coupled to the analog signal processor 821 and configured to send sound signals to one or more speakers 854 via an audio amplifier 852. The audio CODEC 850 may also be coupled to a microphone amplifier 856 which may be coupled to a microphone 858 (e.g., via a microphone jack). A headphone jack 859 may also be coupled to the audio CODEC 850 for outputting audio to headphones.

In some implementations, the computing device 800 may include a separate RF receiver circuit 860 which may be coupled to an antenna 862 for receiving broadcast wireless communication signals. The receiver circuit 860 may be configured to receive broadcast television signals, and provide received signals to the DSP 811 for processing. In some implementations, the receiver circuit 860 may be configured to receive FM radio signals, in which case the received signals may be passed to the Audio CODEC 850 for processing.

In an aspect, processor-executable instructions for accomplishing one or more of the method operations described above may be stored in the internal memory 802, removable memory 822 and/or non-volatile memory 804 (e.g., as on a hard drive, CD drive, or other storage accessible via a network). Such processor-executable instructions may be executed by the control processor 801 in order to perform the methods described herein.

Figure 9:
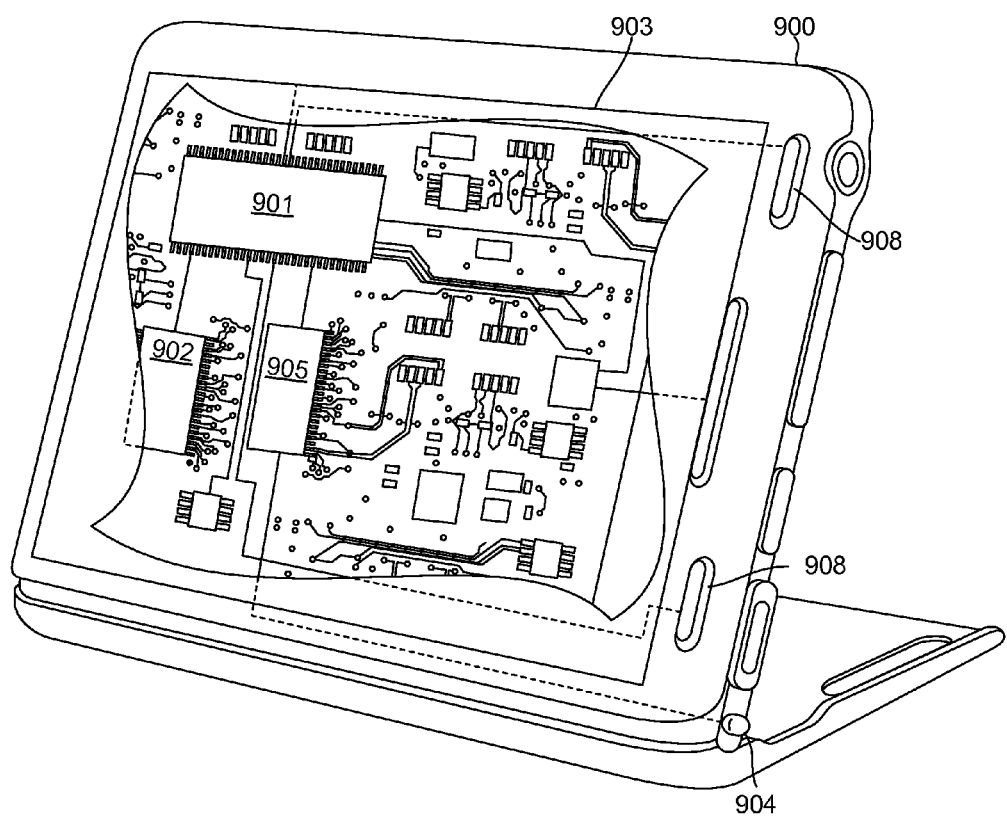
FIG. 9 is an illustration of an example mobile device suitable for use with the various aspects.
Figure 10:
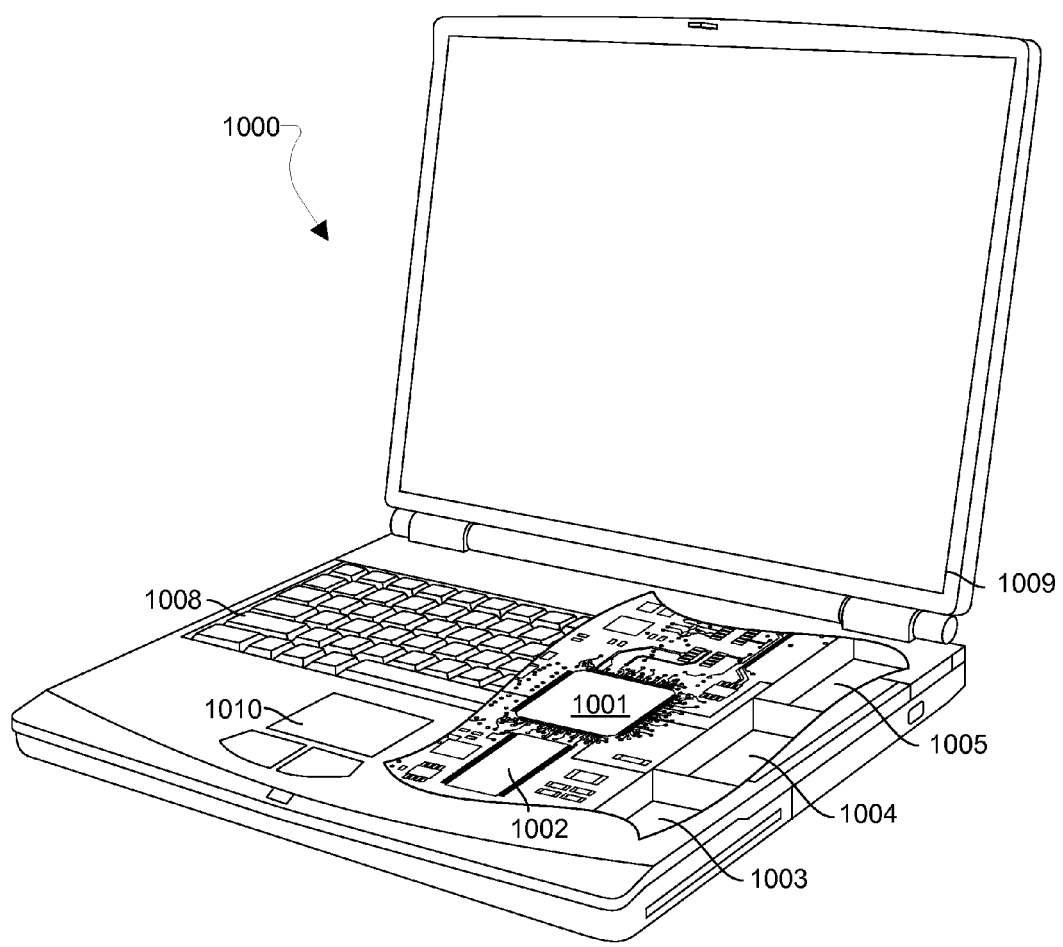
FIG. 10 is an illustration of an example personal computer suitable for use with the various aspects.

An example of a mobile computing device is illustrated in FIG. 9, and an example of a notebook computer is illustrated in FIG. 10. Typical mobile computing devices 900 will have in common the components illustrated in FIG. 9. For example, mobile computing devices 900 may include a processor 901 coupled to internal memory 902 and a touch surface input device/display 903. The touchscreen display 903, such as a resistive sensing touchscreen, capacitive sensing touchscreen, infrared sensing touchscreen, acoustic/piezoelectric sensing touchscreen, or the like. The various aspects are not limited to any particular type of touchscreen display 903 or touchpad technology. Additionally, the computing device 900 may have an antenna 904 for sending and receiving electromagnetic radiation that is connected to a wireless data link and/or cellular telephone transceiver 905 coupled to the processor 901. Computing devices 900 may also include physical buttons 908 for receiving user inputs.

While the various aspects may provide significant performance enhancements for mobile computing devices, other forms of computing devices, including personal computers and laptop computers, may also benefit from pre-parsing of the dynamic language scripts. Such computing devices typically include the components illustrated in FIG. 10 which illustrates an example personal laptop computer 1000. Such a personal computer 1000 generally includes a processor 1001 coupled to volatile memory 1002 and a large capacity non-volatile memory, such as a disk drive 1003. The computer 1000 may also include a compact disc (CD) and/or DVD drive 1004 coupled to the processor 1001. The computer device 1000 may also include a number of connector ports coupled to the processor 901 for establishing data connections or receiving external memory devices, such as a network connection circuit 1005 for coupling the processor 901 to a network. The computer 1000 may further be coupled to a keyboard 1008, a pointing device such as a mouse 1010, and a display 1009 as is well known in the computer arts.

The processor 901, 1001 may be any programmable microprocessor, microcomputer or multiple processor chip or chips that may be configured by software instructions (applications) to perform a variety of functions, including the functions of the various aspects described herein. In some mobile devices, multiple processors 901, 1001 may be provided, such as one processor dedicated to wireless communication functions and one processor dedicated to running other applications. Typically, software applications may be stored in the internal memory 902, 1002 before they are accessed and loaded into the processor 901, 1001. In some mobile devices, the processor 901, 1001 may include internal memory sufficient to store the application software instructions. In some mobile devices, the secure memory may be in a separate memory chip coupled to the processor 901, 1001. The internal memory 902, 1002 may be a volatile or nonvolatile memory, such as flash memory, or a mixture of both. For the purposes of this description, a general reference to memory refers to all memory accessible by the processor 901, 1001, including internal memory 902, 1002, removable memory plugged into the mobile device, and memory within the processor 901, 1001 itself.

The foregoing method descriptions and the process flow diagrams are provided merely as illustrative examples and are not intended to require or imply that the blocks of the various aspects must be performed in the order presented. As will be appreciated by one of skill in the art the order of steps in the foregoing aspects may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored on or transmitted over as one or more instructions or code on a non-transitory computer-readable or processor-readable storage medium. The steps of a method or algorithm disclosed herein may be embodied in a processor-executable software module which may reside on a non-transitory processor-readable or computer-readable storage medium. Non-transitory processor-readable and computer-readable media may be any available storage media that may be accessed by a computer or a processor of a computing device. By way of example, and not limitation, such non-transitory processor-readable or computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer or processor of a computing device. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a non-transitory processor-readable medium and/or non-transitory computer-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein but is to be accorded the widest scope consistent with the following claims and the principles and novel features disclosed herein.

What is claimed is:

1. A method of encoding security labels in a dynamic language value, comprising:
   allocating a number of bits in the dynamic language value to store encoded labels;
   reserving one bit in the allocated bits to signify whether security labels are encoded in a first mode or a second mode; and
   tagging the dynamic language value with security labels that identify an originating domain, the security labels being encoded in either the first mode or the second mode, wherein tagging the dynamic language value with security labels that identify an originating domain comprises encoding dynamic language labels in the first mode if the number of scripts accessing information from scripts originating from other domains is less than the number of allocated bits.

2. The method of claim 1, wherein the method is implemented using a dynamic or scripting languages selected from a group consisting of Java®, JavaScript®, ActionScript®, DART®, PHP, Python®, Ruby, PERL, Scala, Erlang, Candle, and .NET languages.

3. A method of encoding security labels in a dynamic language value, comprising:
   allocating a number of bits in the dynamic language value to store encoded labels;
   reserving one bit in the allocated bits to signify whether security labels are encoded in a first mode or a second mode;

tagging the dynamic language value with security labels that identify an originating domain, the security labels being encoded in either the first mode or the second mode;

determining whether the reserved bit indicates that the first mode or the second mode is selected;

identifying a security label as being encoded as one-hot-bit and performing a bitwise OR operation if it is determined that the reserved bit indicates that the first mode is selected; and identifying the security label as being a reference into a label manager data-structure that stores actual label information and performing memory read operations if it is determined that the reserved bit indicates that the second mode is selected.

4. The method of claim 3, wherein the method is implemented using a dynamic or scripting languages selected from a group consisting of Java®, JavaScript®, ActionScript®, DART®, PHP, Python®, Ruby, PERL, Scala, Erlang, Candle, and .NET languages.

5. A computing device, comprising:
a memory; and
a processor coupled to the memory, wherein the processor is configured with processor-executable instructions to perform operations for encoding security labels in a dynamic language value, the operations comprising:
   allocating a number of bits in the dynamic language value to store encoded labels;
   reserving one bit in the allocated bits to signify whether the security labels are encoded in a first mode or a second mode; and
   tagging the dynamic language value with security labels that identify an originating domain, the security labels being encoded in either the first mode or the second mode, wherein tagging the dynamic language value with security labels that identify an originating domain comprises encoding dynamic language labels in the first mode if the number of scripts accessing information from scripts originating from other domains is less than the number of allocated bits.

6. The computing device of claim 5, wherein the processor is configured with processor-executable instructions such that allocating a number of bits in the dynamic language value comprises allocating a number of bits in a language selected from a group consisting of Java®, JavaScript®, ActionScript®, DART®, PHP, Python®, Ruby, PERL, Scala, Erlang, Candle, and .NET languages.

7. A computing device, comprising:
a memory; and
a processor coupled to the memory, wherein the processor is configured with processor-executable instructions to perform operations for encoding security labels in a dynamic language value, the operations comprising:
   allocating a number of bits in the dynamic language value to store encoded labels;
   reserving one bit in the allocated bits to signify whether the security labels are encoded in a first mode or a second mode;
   tagging the dynamic language value with security labels that identify an originating domain, the security labels being encoded in either the first mode or the second mode;
   determining whether the reserved bit indicates that the first mode or the second mode is selected;
   identifying a security label as being encoded as one-hot-bit and performing a bitwise OR operation if it is determined that the reserved bit indicates that the first mode is selected; and
   identifying the security label as being a reference into a label manager data-structure that stores actual label information and performing memory read operations if it is determined that the reserved bit indicates that the second mode is selected.

8. The computing device of claim 7, wherein the processor is configured with processor-executable instructions such that allocating a number of bits in the dynamic language value comprises allocating a number of bits in a language selected from a group consisting of Java®, JavaScript®, ActionScript®, DART®, PHP, Python®, Ruby, PERL, Scala, Erlang, Candle, and .NET languages.

9. A non-transitory computer readable storage medium having stored thereon processor-executable software instructions configured to cause a processor to perform operations for encoding security labels in a dynamic language value, the operations comprising:
   allocating a number of bits in the dynamic language value to store encoded labels;
   reserving one bit in the allocated bits to signify whether the security labels are encoded in a first mode or a second mode; and
   tagging the dynamic language value with security labels that identify an originating domain, the security labels being encoded in either the first mode or the second mode, wherein
   tagging the dynamic language value with security labels that identify an originating domain comprises encoding dynamic language labels in the first mode if the number of scripts accessing information from scripts originating from other domains is less than the number of allocated bits.

10. The non-transitory computer readable storage medium of claim 9, wherein the stored processor-executable software instructions are configured to cause a processor to perform operations such that allocating a number of bits in the dynamic language value comprises allocating a number of bits in a language selected from a group consisting of Java®, JavaScript®, ActionScript®, DART®, PHP, Python®, Ruby, PERL, Scala, Erlang, Candle, and .NET languages.

11. A non-transitory computer readable storage medium having stored thereon processor-executable software instructions configured to cause a processor to perform operations for encoding security labels in a dynamic language value, the operations comprising:
   allocating a number of bits in the dynamic language value to store encoded labels;
   reserving one bit in the allocated bits to signify whether the security labels are encoded in a first mode or a second mode; and
   tagging the dynamic language value with security labels that identify an originating domain, the security labels being encoded in either the first mode or the second mode;
   determining whether the reserved bit indicates that the first mode or the second mode is selected;
   identifying a security label as being encoded as one-hot-bit and performing a bitwise OR operation if it is determined that the reserved bit indicates that the first mode is selected; and
   identifying the security label as being a reference into a label manager data-structure that stores actual label information and performing memory read operations if it is determined that the reserved bit indicates that the second mode is selected.

12. The non-transitory computer readable storage medium of claim 11, wherein the stored processor-executable software instructions are configured to cause a processor to perform operations such that allocating a number of bits in the dynamic language value comprises allocating a number of bits in a language selected from a group consisting of Java®, JavaScript®, ActionScript®, DART®, PHP, Python®, Ruby, PERL, Scala, Erlang, Candle, and .NET languages.

\* \* \* \* \*